United States Patent [19]

Rick et al.

[11] 3,958,325

[45] May 25, 1976

[54] METHOD AND APPARATUS FOR MAKING STATORS FOR ELECTRICAL MACHINES

[75] Inventors: Manfred Rick, Stuttgart; Rolf Busch, Hildesheim; Klaus Renz, Stuttgart; Günter Weber, Renningen; Werner Mann, Gerlingen; Helmut Schlaich, Rutesheim; Ernst Rohm, Fellbach; Rüdeger Lüders, Stuttgart; Manfred Wilhelm, Nussdorf, all of Germany

[73] Assignee: Robert Bosch G.m.b.H., Stuttgart, Germany

[22] Filed: Sept. 3, 1974

[21] Appl. No.: 502,361

[30] Foreign Application Priority Data

Sept. 1, 1973 Germany............................ 2344193

[52] U.S. Cl.................................. 29/596; 29/609; 72/354; 72/355; 72/363; 72/393
[51] Int. Cl.² ......................................... H02K 15/00
[58] Field of Search ............ 72/354, 355, 363, 393, 72/394, 399, 400, 403; 29/596, 609, 205 D

[56] References Cited
UNITED STATES PATENTS

| | | |
|---|---|---|
| 3,298,218 | 1/1967 | Gollwitzer............................ 72/355 |
| 3,497,949 | 3/1970 | Salt..................................... 72/363 |
| 3,665,593 | 5/1972 | Savage............................. 72/354 X |
| 3,706,120 | 12/1972 | Bulgrin............................. 72/355 X |
| 3,762,041 | 10/1973 | Bair................................... 72/363 X |
| 3,831,268 | 8/1974 | Boyd et al......................... 72/363 X |
| 3,834,013 | 9/1974 | Gerstle............................. 29/596 X |
| 3,842,493 | 10/1974 | Ohuchi et al. .................... 29/609 X |

*Primary Examiner*—C. W. Lanham
*Assistant Examiner*—Dan C. Crane
*Attorney, Agent, or Firm*—Michael J. Striker

[57] ABSTRACT

Annular metallic blanks which consist of packages of interconnected laminae or of sheet metal strips which are coiled edgewise and whose strata are riveted or otherwise secured to each other are converted into stators for electrical machines by cold forming between upper and lower dies and outer and inner calibrating members so that the inner diameter of each blank is increased during cold forming, that the peripheral surface of the stator has two cylindrical portions flanking a convex median portion, and that the outermost portions of the end surfaces of the stator are formed with annular recesses. Prior to cold forming, each blank is subjected to a preliminary shaping treatment including chamfering the axial ends of its internal and peripheral surfaces.

17 Claims, 3 Drawing Figures

METHOD AND APPARATUS FOR MAKING STATORS FOR ELECTRICAL MACHINES

BACKGROUND OF THE INVENTION

The present invention relates to a method and apparatus for making stators for electrical machines. More particularly, the invention relates to improvements in a method and apparatus for converting annular metallic stator blanks into finished stators.

It is known to assemble a stator from a package of laminae which are riveted or otherwise rigidly secured to each other to form a blank ready for treatment of its internal, external and end surfaces so as to convert the blank into a finished stator. It is also known to make a stator blank from a sheet metal strip which is wound edgewise and whose strata are secured to each other prior to machining for the purpose of converting the blank into a finished stator. As a rule, the converting operation involves a preliminary smoothing before the blank is mounted on a mandrel of a first machine tool so as to allow for the machining of its peripheral surface and both end surfaces, i.e., to determine the ultimate outer diameters and axial length of the product. In the next step, the semifinished product is mounted in a second machine tool which engages its peripheral surface and treats the internal surface with a honing tool to determine the internal diameters of the thus obtained finished stator.

A drawback of the just described procedure is that the conversion of a blank into a stator involves at least three discrete machining operations with attendant losses in time, high initial cost and excessive outlay for machine tools. Moreover, repeated clamping of the blank (first on a mandrel and thereupon in a honing machine) often results in pronounced misalignment of the axes of internal and external surfaces of the stator.

SUMMARY OF THE INVENTION

An object of the invention is to provide a simple, reliable and economical method of converting annular metallic blanks into finished stators for electrical machines.

Another object of the invention is to provide a method of making stators which does not involve removal of material from the blanks, which includes a small number of steps, which can be practiced by resorting to relatively simple apparatus, and which insures absolute identity of all dimensions of successively produced stators.

A further object of the invention is to provide a novel and improved apparatus for making stators for electrical machines.

An additional object of the invention is to provide an apparatus which can produce a succession of stators with a high degree of reproducibility, at a relatively low cost, without necessitating removal of material from the blanks, and at a rate which is higher than in heretofore known apparatus.

One feature of the invention resides in the provision of a method of converting annular metallic blanks into stators for use in electric motors, generators or other electrical machines. The method comprises the steps of placing successive blanks between cold forming dies and moving the dies with respect to each other to deform the blank therebetween by the application of squeeze pressure and to thus impart to the blank between the dies a shape provided by the dies. Such shape corresponds to that of a stator. The method may further comprise the step of subjecting the blanks to a preliminary shaping operation which precedes the cold forming between the dies and preferably includes chamfering the blanks at one or both axial ends of their cylindrical internal surfaces and/or at one or both axial ends of their cylindrical peripheral surfaces.

Each blank may consist of a package of interconnected metallic laminae or of a sheet metal strip which is coiled edgewise.

The configuration of the dies is preferably such that the inner diameter of a blank is increased during conversion into a stator, that the peripheral surface of the stator has two cylindrical portions and a convex median portion between the cylindrical portions, that the outermost portions of the end surfaces of the stator are provided with annular recesses which extend all the way to the respective cylindrical portions of the peripheral surface, and that the concentricity between the increased inner diameter and the two cylindrical portions of the peripheral surface of the stator is extremely high.

The novel features which are considered as characteristic of the invention are set forth in particular in the appended claims. The improved apparatus itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 2:
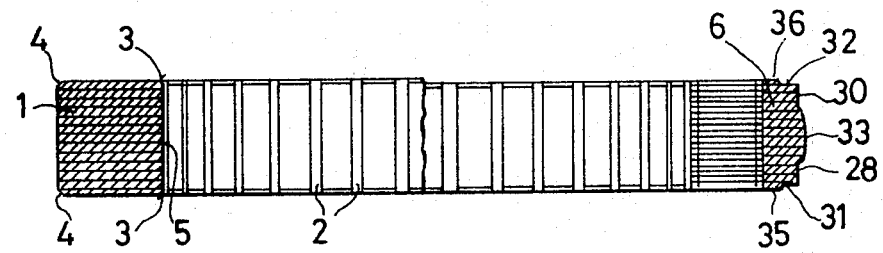
FIG. 2 is a sectional view as seen in the direction of arrows from the line II—II of FIG. 1, the left-hand portion showing a section of the blank and the right-hand portion showing a section of the stator.
Figure 1:
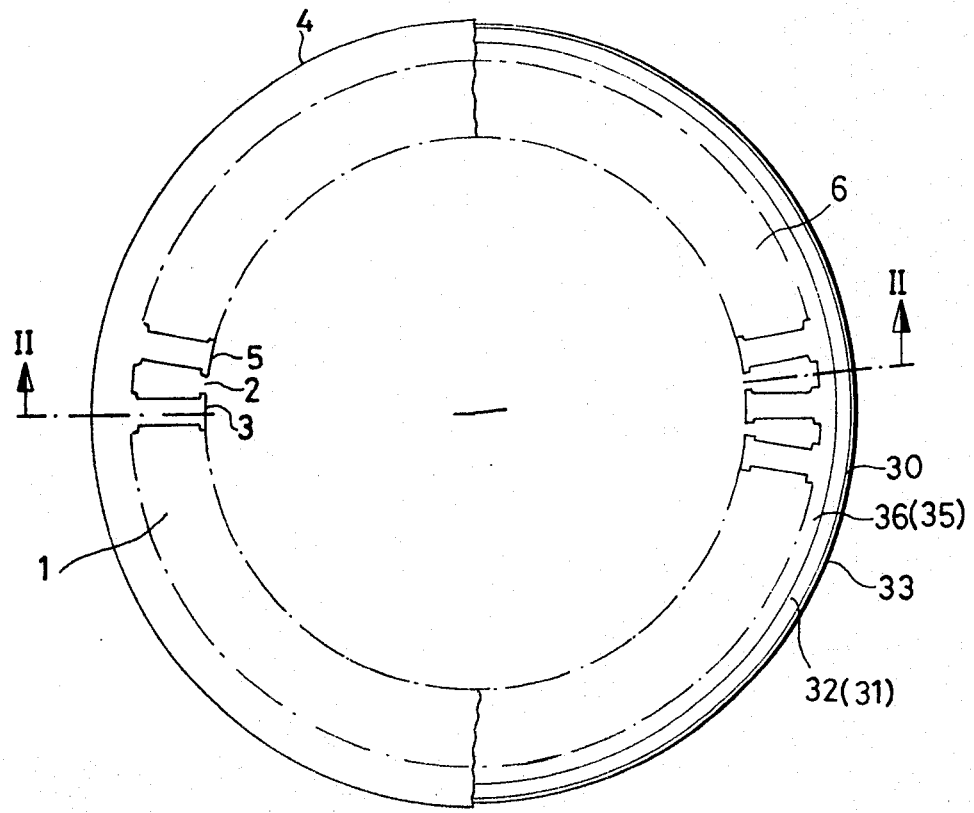
FIG. 1 is a diagrammatic top view of a blank of a stator, the left-hand portion of the FIG. showing the blank as it appears prior and the right-hand portion of the FIG. showing the blank as it appears subsequent to conversion into a stator.

FIGS. 1 and 2 show a portion of an annular stator blank 1 consisting of a strip of sheet metal which is wound edgewise and whose strata are riveted or otherwise rigidly secured to each other. The internal surface 5 of the blank 1 is formed with customary radially outwardly extending slots 2 for the stator windings. The slots 2 are preferably formed by stamping prior to winding of the strip. The ends of the internal surface 5 are chamfered, as at 3, and the ends of the external surface 5A are chamfered, as at 4.

The right-hand portion of FIG. 2 shows the profile of a finished stator 6. The peripheral surface of the stator 6 has a convex median portion 33 and two substantially cylindrical portions 28, 30 which flank the median portion 33. The outermost portions of the end surfaces 35, 36 of the stator 6 are respectively formed with shallow annular recesses 31, 32 which extend all the way to the respective cylindrical surface portions 28, 30. It will be noted that the thickness (axial length) of the stator 6 is somewhat less than the thickness of the blank 1. The blank 1 is assumed to have been subjected to a preliminary or coarse shaping including the formation of the chamfers 3 and 4.

Figure 3:
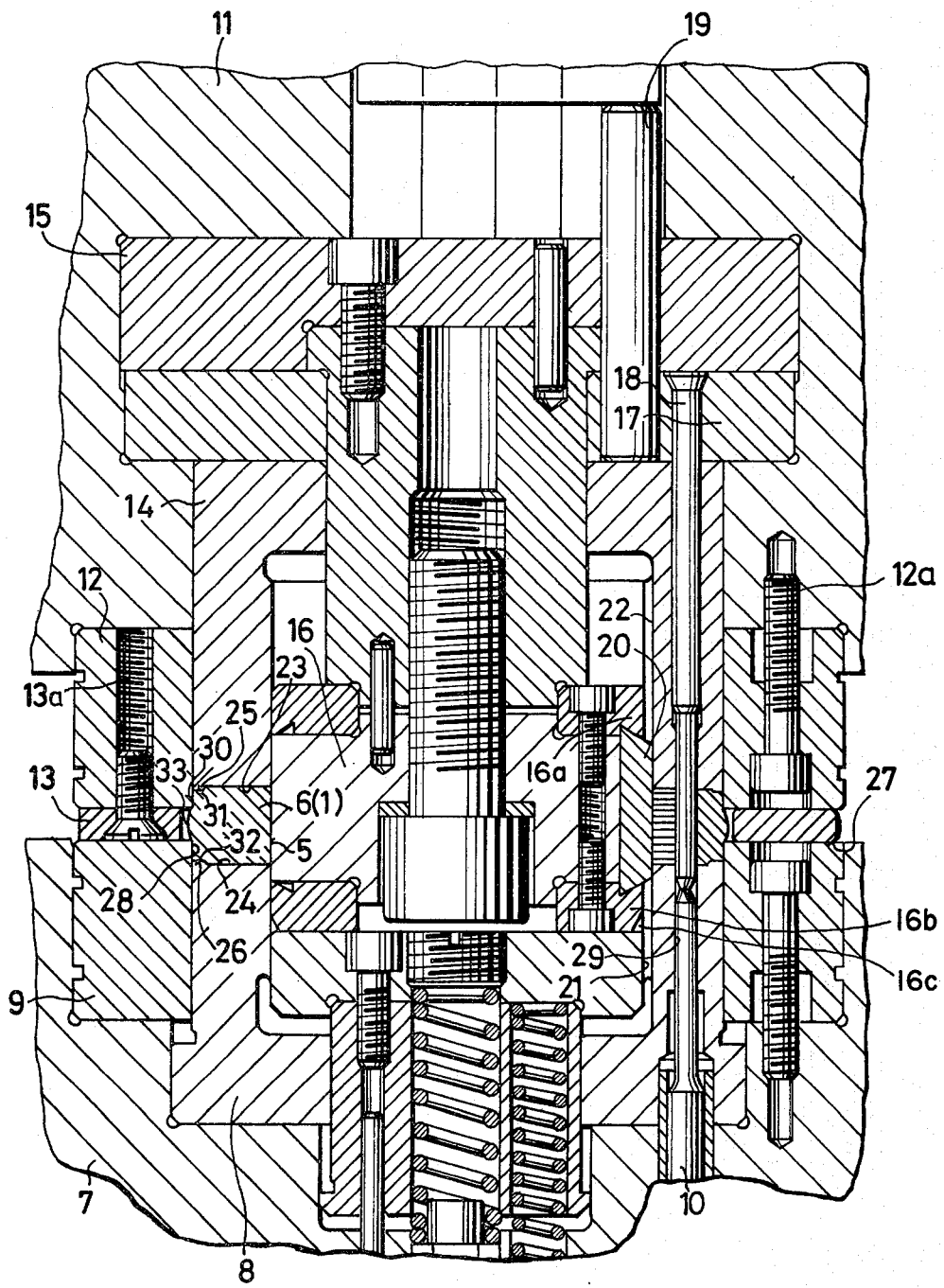
FIG. 3 is an axial sectional view of a cold forming apparatus for conversion of blanks into stators, the parts of the apparatus being shown in positions they assume immediately upon completed conversion of a blank into a stator.

The shaping apparatus which can convert blanks 1 into stators 6 by cold forming is shown in FIG. 3. It comprises a base plate or carrier 7 for a ring-shaped lower die 8. The die 8 is reciprocable in the carrier 7 as well as in an outer calibrating die or ring 9 which is affixed to the carrier so as to surround the upper portion of the lower die and extends at times beyond the upper end face 24 of this die to shape the portion 28 of the peripheral surface of a stator. The lower die 8 is traversed by two upright locating posts 10 (one shown) which are axially movably mounted in the carrier 7. Portions of the posts 10 extend into the adjacent slots 2 of a properly inserted stator blank 1 resting on the upper end face 24 of the lower die 8.

The apparatus further comprises a reciprocable second carrier or traverse 11 mounted at a level above the die 8 and supporting a second outer calibrating ring or die 12 which serves to shape the portion 30 of the peripheral surface of a stator 6. The calibrating ring 12 supports a ring-shaped distancing member 13 which is fixedly secured thereto by bolts 13a and limits the extent to which the ring 12 can be moved toward the ring 9. Similar bolts 12a connect the calibrating ring 12 to the carrier 11. The inner diameter of the distancing member 13 (which is concentric with rings 8, 12) exceeds the inner diameters of the rings 8, 12 so as to provide an annular space for the outwardly bulging median portion of the stator 6, i.e., for that portion which is bounded by the convex median portion 33 of the peripheral surface. The inner diameter of the calibrating ring 8 equals that of the calibrating ring 12, i.e., the portions 28, 30 of the peripheral surface of a stator 6 have identical diameters and a common axis.

The upper carrier 11 further serves as a guide for a die or ram 14 having an outer diameter which is identical with the inner diameter of the upper calibrating ring 12. The die 14 is a hollow cylinder which extends into the ring 12 from above. The inner diameter of the die 14 is identical with the inner diameter of the die 8.

The carrier 11 also supports a plate-like holder 15 for an inner calibrating member or die 16 which determines the diameter of the internal surface of a stator 6. The holder 15 is mounted in an internal chamber of the carrier 11 above a plate 17 for downwardly extending pins 18. The plate 17 is installed between the holder 15 and the upper end portion of the die 14. The number of pins 18 equals the number of slots 2 in a blank 1.

The carrier 11 further supports two hold-down plungers 19 (one shown) which extend through the holder 15 and plate 17 and abut against the upper end face of the die 14.

The inner calibrating member 16 carries projections or ribs 20 which are parallel to its axis and extend radially beyond its peripheral surface. The ribs 20 are held on the main body of the inner calibrating member by clamping rings 16a and 16b of the same outer diameter as the main body and secured by screws to the latter. The lower edge of the lower clamping ring is provided with a chamfer 16c as shown in FIG. 3. The number of projections 20 equals the number of slots 2 in a blank 1. The internal surfaces of the dies 8 and 14 are formed with vertical slots 21, 22 which guide the projections 20 during movement of the die 14 toward or away from the die 8.

The upper end face 24 of the die 8 faces the lower end face 23 of the die 14. The outer marginal portion of the end face 24 is formed with a ring-shaped platform 26 of rectangular cross section which forms the annular recess 31 in the end surface 35 of a stator 6, and the outer marginal portion of the end face 23 is formed with a similar ring-shaped platform 25 which shapes the recess 32 in the end surface 36 of a stator.

When a blank 1 is to be inserted into the apparatus of FIG. 3, the upper side of the platform 26 on the top face 24 of the lower die 8 is flush with the upper end face 27 of the lower outer calibrating ring 9. This is the upper or extended position of the lower die 8. The upper die 14 is retracted or raised, together with the upper calibrating ring 12, distancing member 13 and inner calibrating member 16. The blank 1 is inserted in such a way that it comes to rest on the lower die 8 and that two of its slots 2 receive the locating posts 10. In the next step, the inner calibrating member 16 is caused to descend and to enter the central opening (bounded by the internal surface 5) of the blank 1. The lower die 8 yields and descends to the lower or retracted position of FIG. 3 whereby the lower part of the external surface of the blank penetrates into the lower calibrating ring 9 and the parts 8, 9 cooperate to shape the recess 31 and the portion 28 of the peripheral surface of the developing stator. The projections 20 of the inner calibrating member 16 enter the adjacent slots 2. The pins 18 descend with the calibrating member 16 and enter the radially outermost portions of the respective slots 2 and the registering bores 29 in the lower die 8. Two of the pins 18 expel the posts 10 from the registering slots 2 against the opposition of springs, not shown, which urge the posts 10 upwardly.

The pins 18 and the respective projections 20 constitute composite inserts which enter the registering slots 2 not later than when the end face 23 of the die 14 reaches the upper end surface 36 of a blank 1 between the dies 8, 14 whereby such inserts preserve the slots 2 during conversion of the blank into a stator 6.

The upper die 14, the upper outer calibrating ring 12 and the distancing member 13 descend with the calibrating member 16 whereby the ring 12 shapes the portion 30 of the peripheral surface on the partially completed stator.

As the distancing member 13 approaches the end face 17 of the ring 9, the die 14 reaches the upper end surface 36 of the blank while the lower die 8 already dwells in its lower or retracted position and the calibrating member 16 has completed the shaping of the internal surface of the blank. Such shaping involves increasing the diameter of the internal surface 5 of the blank 1 to the larger diameter of the internal surface of the stator 1 due to penetration of the main body of the calibrating member into the blank. The descending die 14 deforms the blank to complete its conversion into a stator whereby a portion of the material of the blank is squeezed into the space which is surrounded by the distancing ring 13 and is formed with the convex median portion 33 of the peripheral surface of the stator. The conversion is completed when the distancing member 13 reaches the end face 27 of the calibrating ring 9. The platform 25 on the lower end face 23 of the die 14 provides the upper end surface 36 of the stator 1 with the annular recess 32 not later than when the distancing member 13 is arrested by the calibrating ring 9.

This completes the cold forming of the stator which can be removed after the carrier 11 is lifted to retract the parts 12, 13, 14 and 16 as well as the pins 18. The recesses 31, 32 of the stator can receive portions of retaining or locating means in the housing of an electrical machine.

The means for moving the carrier 11 up and down may comprise one or more hydraulic motors (not shown), and the lower die 8 can be biased to its upper or extended position by one or more springs. The blanks 1 can be inserted and the stators 6 can be removed by hand or by resorting to automatic or semiautomatic feeding and removing attachments.

In accordance with a presently preferred embodiment, the opening of the apparatus preparatory to removal of a freshly formed stator 6 takes place in several steps. The first step involves lifting of the inner calibrating member 16, calibrating ring 12 and distancing member 13 while the plungers 19 continue to maintain the die 14 in abutment with the upper end surface of the stator. The plate 17 moves with the carrier 11 and retracts the pins 18 from the respective slots of the stator. The bias of the plungers 19 need not be pronounced. Such retraction of parts 16, 12 and 13 prior to retraction of the die 14 reduces the likelihood of damage to (e.g., tearing apart of) the stator. In the next step, the die 14 is lifted in response to further upward movement of the carrier 11 whereby the lower die 8 automatically reassumes its extended position and expels the lower portion of the stator from the calibrating ring 9. The stator is then readily removable from the apparatus. In its retracted position, the die 8 defines with the ring 9 a shallow recess which receives the lower portion of the stator.

An important advantage of the improved method and apparatus is that the dimensions of each of a series of successively produced stators are identical. Moreover, the axis of the internal surface of each stator coincides exactly with the axis of the peripheral surface. Still further, the cold forming of blanks 1 to produce the stators 6 does not promote the separation of laminations or strata of the stator material, a phenomenon which is observable when the blanks are machined in accordance with the presently prevailing practice. Also, the cost of converting a blank into a stator is a small fraction of the cost of making stators in accordance with conventional methods because a single apparatus suffices to complete the conversion of blanks into stators whereas the presently known methods involve the machining of surfaces in at least two different machines. The conversion of a blank into a stator by cold forming takes up an interval of time which is much shorter than the interval which is needed to produce stators in presently known material removing machines. It has been found that the output of the improved apparatus greatly exceeds the output of conventional stator making machines which utilize material removing tools and treat the surfaces of stator blanks in several stages one of which involves removing material while the blank is mounted on a mandrel or the like and another of which involves clamping the peripheral surface of the semifinished product to allow for removal of material at the internal surface of the semifinished product.

Without further analysis, the foregoing will so fully reveal the gist of the present invention that others can, by applying current knowledge, readily adapt it for various applications without omitting features which fairly constitute essential characteristics of the generic and specific aspects of our contribution to the art and, therefore, such adaptations should and are intended to be comprehended within the meaning and range of equivalence of the claims.

What is claimed as new and desired to be protected by Letters Patent is set forth in the appended claims.

We claim:

1. A method of producing stators for electrical machines comprising the steps of forming an annular blank of interconnected metallic laminae having substantially cylindrical internal and external surfaces and being formed with radial slots extending outwardly from said internal surface thereof; subjecting the blank to a preliminary shaping operation to provide chamfers at the inner and outer surfaces at the opposite ends of the blank; and cold deforming the blank by compressing the same in axial direction while simultaneously radially expanding the same to a shape corresponding to that of the stator.

2. A method as defined in claim 1, wherein said interconnected metallic laminae consist of superimposed individual laminae connected to each other.

3. A method as defined in claim 1, wherein said interconnected metallic laminae consist of a sheet metal strip formed with spaced slots extending from one edge thereof into the latter, said sheet metal strip being convoluted edgewise with the slotted edge forming the inner surface of the blank.

4. Apparatus for converting annular metallic blanks having internal and external surfaces and two end surfaces into stators for use in electrical machines, comprising coaxial first and second annular cold forming dies having end faces facing each other, at least one of said dies being movable axially toward and away from the other of said dies so as to allow for insertion of a blank between said end faces prior to movement of said one die towards the other die and the removal of a stator upon movement of said one die away from said other die; an inner calibrating member having a tapered leading portion and a trailing cylindrical portion movable into a blank between said dies to thereby enlarge the inner diameter of the blank upon entering of said cylindrical portion thereinto; and ring-shaped first and second outer calibrating members respectively surrounding said first and second dies and extending beyond the respective end faces to shape portions of the external surface of a blank between said dies in response to movement of said one die and the respective outer calibrating member toward said outer die to apply a deforming pressure to the end surfaces of the blank.

5. Apparatus as defined in claim 4, further comprising means for limiting the extent of movement of said one die toward said other die so that said outer calibrating members are spaced apart from each other when said one die is nearest to said other die whereby a portion of the blank is squeezed into the space between said outer calibrating members.

6. Apparatus as defined in claim 5, wherein said outer calibrating members have end faces facing each other and said other die is movable axially in response to movement of said inner calibrating member into a blank between said dies from an extended position in which said end face thereof is substantially flush with the end face of the respective outer calibrating member and a retracted position in which said other die and the respective outer calibrating member define a recess for a portion of the blank.

7. Apparatus as defined in claim 6, wherein the movement of said inner calibrating member into a blank between said dies precedes the engagement between the end face of said one die and the respective end surface of a blank between said dies.

8. Apparatus as defined in claim 4 for converting blanks having slots extending radially outwardly from the internal surfaces thereof, further comprising at least two locating members each extending into a discrete slot of a blank between said dies, at least while said one die approaches said other die.

9. Apparatus as defined in claim 4 for converting blanks having slots extending radially outwardly from the internal surfaces thereof, further comprising inserts extending into the slots of a blank between said dies, at least while said one die engages such blank, to preserve the slots during conversion of the blank into a stator.

10. Apparatus as defined in claim 9, wherein each of said inserts comprises a projection on said inner calibrating member.

11. Apparatus as defined in claim 9, wherein each of said inserts comprises a pin movable with said one die.

12. Apparatus as defined in claim 11, wherein said pins are arranged to enter the radially outermost portions of the respective slots.

13. Apparatus as defined in claim 4, wherein each of said end faces has a raised annular platform adjacent to the respective outer calibrating member to impress into the respective end surface of a blank between said dies an annular recess not later than upon completion of movement of said one die toward said other die.

14. Apparatus as defined in claim 4, further comprising a ring-shaped distancing member connected with one of said outer calibrating members and abutting against the other of said outer calibrating members in response to movement of said one die toward said other die to thereby limit the extent of movement of said one die toward said other die, said distancing member defining with said outer calibrating members an annular space into which a portion of the blank between said dies is squeezed in response to movement of said one die toward said other die.

15. Apparatus as defined in claim 4, further comprising means for moving said one die and the respective outer calibrating member relative to said inner calibrating member and vice versa.

16. Apparatus as defined in claim 15, wherein said other die is movable axially in response to movement of said inner calibrating member into a blank between said dies from an extended position in which said end face of said other die is substantially flush with an end face of the respective outer calibrating member to a retracted position, and further comprising means for urging said other die to said extended position to thereby expel a stator from the respective outer calibrating member subsequent to movement of said inner calibrating member and the other outer calibrating member away from the stator between said dies and the ensuing movement of said one die away from said other die.

17. Apparatus as defined in claim 16, further comprising means for holding said one die in engagement with a stator between said dies during movement of said inner calibrating member and said other outer calibrating member away from said one die.

* * * * *